UNITED STATES PATENT OFFICE.

WILLIAM N. BLAKEMAN, JR., OF NEW YORK, N. Y.

PROCESS OF TREATING PIGMENTS FOR PAINTS.

SPECIFICATION forming part of Letters Patent No. 702,174, dated June 10, 1902.

Application filed October 25, 1899. Serial No. 734,698. (No specimens.)

*To all whom it may concern:*

Be it known that I, WILLIAM N. BLAKEMAN, Jr., of the borough of Manhattan, in the city, county, and State of New York, have invented a new and useful Process of Treating Pigments for Paints, which invention is fully set forth in the following specification.

The object of this invention is to treat pigments used in the manufacture of paints in such a manner that they shall exhibit great body and improved drying properties when ground in oil.

In my application for Letters Patent filed May 15, 1899, Serial No. 716,913, I have described a process for imparting body or spreading power to oil pigments by incorporating with the pigment before grinding it in oil an aggregating or body-giving agent or agents. I have now discovered that if in addition to such body-giving agent or agents a separate "drier" be incorporated with the pigment the pigment so treated will not only exhibit great body when ground in oil, but will also exhibit improved drying properties. As described in my said application, many substances are capable of use as aggregating or body-giving agents, among them being resins, gums, gum-resins, balsams, farina, fecula, starch, albumen, gluten, gelatin, casein, curds, cheese, milk, sugar, syrup, glucose, dextrine, British gum, spermaceti, stearine, stearic acid, and other fatty acids, oils, waxes, the heavier liquid and solid paraffins, glycerin, many metallic oxids and other salts, as the lead oxids, the alums, acetate of lead, acetate of zinc, sulfate of zinc, saltpeter, chlorid of ammonium, chlorid of sodium, and the like. Although any one or more of these substances may be employed in carrying out the process herein described, I prefer to employ such agents as stearic acid or stearine-wax, spermaceti, beeswax, carnauba-wax, pine-wax, palm-wax, mineral wax, paraffin-wax, and ozocerite; but whatever the body-giving agent selected I attenuate the same in a suitable solvent or volatile vehicle before incorporating it with the pigment, and as attenuating vehicles water, the alcohols, spirits, ethers, spirits of turpentine, the naphtha group of paraffins, milk of lime, solutions of the alkaline carbonates, and borax solutions may, among others, be employed. The selection of a vehicle can be readily made by any one skilled in this branch of chemistry.

The driers which may be used in carrying out my process embrace a large variety of substances. The term "drier" as used herein is intended to include all substances of animal or vegetable origin which will absorb oxygen and pass from a lower to a higher state of oxidation and transmit or carry their oxygen to oxidizable matter with which they may come in contact, and the term also includes all metallic or mineral substances which carry oxygen in combination and will yield a portion of such oxygen to any oxidizable matter with which said substances may be incorporated. Examples of driers are the drying-oils, the turpentines, the resin acids, the acid resins, and the metallic oxids and salts. One or more of these driers may be used in my process or a commercial liquid drier, if desired. I prefer, however, to employ the salts of manganese, such as sulfate of manganese, manganous sulfate, acetate of manganese, borate of manganese, and the like. Whatever agent be selected as a drier I attenuate it in a volatile vehicle before incorporating it with the pigment, and the selection of a suitable solvent or vehicle for a particular drier can be readily made by any one skilled in the art. Water, the alcohols, spirits, ethers, spirits of turpentine, and the naphtha group of paraffins are all available for use. If it be desired to use one of the commercial liquid driers, known as "japans" and the like, the commercial drier selected, if it be a turpentine drier, may be attenuated with one of the naphtha group of paraffins and then incorporated with the pigment and the naphtha then evaporated and recovered through a condenser. If a spirit drier be selected, it may be attenuated with alcohol, then incorporated with the pigment, and the alcohol then evaporated.

In carrying out my process I prefer to combine the drier with the pigment as the first step. I therefore first select a drier; second, attenuate it in a suitable solvent or vehicle; third, incorporate this solution with the pigment, and afterward evaporate the vehicle. I then select an aggregating or body-giving agent, attenuate it in a suitable solvent or vehicle, incorporate this solution with the pigment, (previously treated with the drier,) and then evaporate the vehicle.

As a practical illustration of my process the following may be given: I select sulfate of manganese as a drier and dissolve one-fourth to one-half of one per cent. in one hundred parts of water; second, incorporate this solution with one hundred parts of pigment—say zinc-white—and, third, evaporate the water with a gentle heat. I then select paraffin-wax (of about 115° to 120° Fahrenheit melting-point) as an aggregating or body-giving agent and dissolve one-half of one per cent. in one hundred parts of any of the naphtha group of paraffins; second, incorporate this solution with the pigment, (already combined with the drier,) and, third, evaporate the naphtha.

I do not confine myself to the steps named, as the great variety of pigments to be treated and the body-giving agents and driers to be used may demand changes to suit each case as practice shall dictate. Thus the body-giving agent may first be combined with the pigment and the drier then added, or in some cases the body-giving agent and the drier may be incorporated at one operation. For the same reasons I do not confine myself to the use of any particular volatile vehicle or solvent or to the use of separate solvents for the body-giving agent and drier, as in some cases it may be found advisable to use a common solvent, such as the alcohols or spirits. Having due regard, however, to the economies of the process, the above method of manipulation will be found to give very satisfactory results, and any changes will readily suggest themselves to those skilled in the action and capacity of solvents. If it be desired to recover the solvent in any case, it may be done through the well-known condenser.

The percentage of body-giving agent and the percentage of drier to pigment may be regulated as practice shall dictate. Heat may be applied whenever found advisable.

Zinc-white, white lead, or any other pigment may be treated by my process, with the result that such pigment will be improved in two respects. First, it will by reason of the treatment with the body-giving agent exhibit greater body when ground in oil, and, second, by reason of the treatment with the drier it will cause the paint to dry in at least one hour's less time than a paint in which the drier is added to the oil. If zinc-white be treated in this way, five parts of it will be found equal to ten parts of Dutch lead, and its usual slow-drying properties will be greatly accelerated.

Certain pigments, among them zinc-white, treated with a body-giving agent and a separate drier, as herein described, and then ground in a non-drying oil, such as cotton-seed oil, will produce the remarkable effect of imparting drying properties to the non-drying oil, as described in my application for patent filed January 2, 1900, Serial No. 59, and a paint compound so formed will, although made with a non-drying oil, dry and harden in a perfectly satisfactory manner and will also exhibit great body or spreading power.

Having thus fully described my invention, I claim—

1. The process of imparting to oil pigments, body or spreading power and improved drying properties, which consists in attenuating in a volatile vehicle or vehicles, a drier and a separate body-giving agent, then incorporating such attenuated agents with the pigment, and then evaporating the vehicle.

2. The process of imparting to oil pigments body or spreading power and improved drying properties, which consists in attenuating in a volatile vehicle or vehicles, a drier and a separate body-giving agent, then incorporating such attenuated agents with the pigment, then evaporating the vehicle, and then grinding the pigment in oil.

3. The process of imparting to oil pigments body or spreading power and improved drying properties, which consists in attenuating in a volatile vehicle or vehicles, a salt of manganese and a separate body-giving agent, then incorporating such attenuated agents with the pigment, and then evaporating the vehicle.

4. The process herein described of imparting body and drying properties in oil to oil pigments, which consists in attenuating in a volatile vehicle or vehicles a drier and a paraffin-wax, incorporating such attenuated substances with the pigment, and evaporating excessive moisture before the pigment is ground in oil.

5. The process herein described of imparting body and drying properties in oil to oil pigments which consists in attenuating in a volatile vehicle or vehicles a salt of manganese and a paraffin-wax, incorporating such attenuated substances with the pigment, and evaporating excessive moisture before the pigment is ground in oil.

6. The process of imparting to oil pigments body or spreading power and improved drying properties, which consists in attenuating a drier in a volatile vehicle, incorporating the solution with the pigment, and evaporating the vehicle; then attenuating a separate body-giving agent in a volatile vehicle, incorporating this solution with the combined pigment and drier, and evaporating the vehicle.

7. The process of imparting body or spreading power and improved drying properties to zinc-white pigment, which consists in attenuating in a volatile vehicle or vehicles a drier and a separate body-giving agent, then incorporating such attenuated agents with the zinc-white, and then evaporating the vehicle.

8. The process of imparting body or spreading power and improved drying properties to zinc-white pigment, which consists in attenuating in a volatile vehicle or vehicles, a drier and a separate body-giving agent, then incorporating such attenuated agents with the zinc-white, then evaporating the vehicle, and then grinding the pigment in oil.

9. The process of imparting body or spreading power and improved drying properties to zinc-white pigment, which consists in attenuating in a volatile vehicle or vehicles a salt of manganese and a separate body-giving agent, then incorporating such attenuated agents with the zinc-white, and then evaporating the vehicle.

10. The process herein described of imparting body and drying properties in oil to zinc-white pigment, which consists in attenuating in a volatile vehicle or vehicles a drier and a paraffin-wax, incorporating such attenuated substances with the zinc-white, and evaporating excessive moisture before the pigment is ground in oil.

11. The process herein described of imparting body and drying properties in oil to zinc-white pigment, which consists in attenuating in a volatile vehicle or vehicles, a salt of manganese and a paraffin-wax, incorporating such attenuated substances with the zinc-white, and evaporating excessive moisture before the pigment is ground in oil.

WM. N. BLAKEMAN, JR.

Witnesses:
FRANCIS P. REILLY,
G. A. STIMPSON.